United States Patent [19]

Drake et al.

[11] Patent Number: 5,300,569
[45] Date of Patent: Apr. 5, 1994

[54] ADHESIVE RUBBER COMPOUNDS

[75] Inventors: Ronald E. Drake; John M. Labriola, both of Grand Junction, Colo.

[73] Assignee: Ricon Resins, Inc., Grand Junction, Colo.

[21] Appl. No.: 16,487

[22] Filed: Feb. 10, 1993

Related U.S. Application Data

[63] Continuation of Ser. No. 575,990, Aug. 31, 1990, abandoned, which is a continuation of Ser. No. 571,459, Aug. 21, 1990, abandoned.

[51] Int. Cl.$^5$ .............................................. C08L 33/02
[52] U.S. Cl. ......................................... 525/78; 525/74; 525/207; 525/221; 525/285
[58] Field of Search ................. 525/74, 78, 207, 221, 525/285

[56] References Cited

U.S. PATENT DOCUMENTS 4,908,396  3/1990  Evans et al. .......................... 523/202

FOREIGN PATENT DOCUMENTS 231731   12/1986  European Pat. Off.
2539412  3/1976   Fed. Rep. of Germany.
1576333  7/1969   France.
7549890  9/1990   Japan.
7697167  9/1990   Japan.

OTHER PUBLICATIONS

Encyclopedia of Polymer Science and Engineering, vol. 6, *Ethylene-Propylene Elastomers*, pp. 522-524, 1986 John Wiley & Sons, USA.
Schidowitz, P. and Redfarm, C. A. (1935) J. Soc. Chem. Ind. 54:263T.
Nelson, E. R. et al., (1958) Ind. Eng. Chem. 50:329.
Von Ooij, W. J. (1979), "Fundamental Aspects of Rubber Adhesion to Brass-plated Steel Tire Cords," Rubber Chem. Tech. 52:605-675.
Von Ooij, W. J. (1984) Rubber Chem., Technol. 57:421-456.
Bacon, R. G. R. and Farmer, E. H. (1939) Rubber Chem. Tech. 12:200-209.
Kambara, S. et al. (1949) Chemical Abstracts 43:1595.
Drake, (1982), "Property Modifications of EPDM Rubber with Liquid 1,2-Polybutadiene Resins," Elastomerics pp. 28-34.

*Primary Examiner*—Melvyn J. Marquis
*Attorney, Agent, or Firm*—Greenlee and Winner

[57] ABSTRACT

Uncured adhesive elastomeric compositions are provided comprising an unsaturated polymeric dicarboxylic acid or derivative adduct and an elastomer. These compositions are capable of adhesion to a broad, general range of materials and are useful for bonding elastomers to other elastomers, to plastic materials, to metal, fabrics, fibers, paper and miscellaneous substrates. These materials can also be bonded to each other using a film or spreadable liquid comprised of a composition of this invention and curing said film or liquid in contact with said substrates.

17 Claims, No Drawings

ADHESIVE RUBBER COMPOUNDS

This is a continuation of copending application Ser. No. 07/575,990, now abandoned, filed on Aug. 31, 1990, which is a continuation of copending application Ser. No. 07/571,459, now abandoned, filed Aug. 21, 1990.

FIELD OF THE INVENTION

This invention provides compositions for adhesion of elastomers to other elastomers, metals, plastics, mineral compositions, fabrics and fibers of many types. The compositions are unsaturated polymeric resins adducted to unsaturated dicarboxylic acids, or derivatives of these acids, compounded with elastomers which exhibit a high degree of adhesiveness when cured.

BACKGROUND OF THE INVENTION

Many methods have been published in the scientific and technical literature describing means for achieving improvement in the adhesive bond between elastomers and various substrates. While this effort has led to many patents and some significant improvements in this adhesive bond, there is still a considerable need for better bonding techniques. A particularly fruitful modification of natural rubber and certain synthetic elastomers has been incorporation of carboxylic acid functionality into the rubber chain through copolymerization or grafting techniques with such monomers as acrylic and methacrylic acid or the esters of these acids, which may later be converted to carboxylic acid functionality by saponification of the esters. These techniques have resulted in useful elastomers with significant bonding capabilities, but these methods have not received general acceptance for the reason that the elastomers formed by such techniques are usually viscous and hard to handle, the polymerization chemistry is complicated and difficult, and the products are not compatible with a wide range of other elastomers. To a limited extent, maleic acid, fumaric acid, itaconic acid and the anhydride derivatives of maleic acid and itaconic acid have been used to graft or adduct solid elastomers with carboxylic acid functionality (Trivedi, B.C. Culbertson, B.M. (1982) "Maleic Anhydride," Plenum Press). Again these methods suffer from mechanical difficulties associated with handling the high molecular weight solid elastomer during the chemical reaction sequences.

A more desirable possibility from the standpoint of the rubber compounder who needs the flexibility to compound almost any elastomer specifically for an adhesive requirement would be the addition of lower molecular weight carboxylic acids or derivatives to the rubber compound during mixing of the rubber compound. While in some special applications this has been achieved, this method has not received general acceptance because most carboxylic acids and derivatives do not behave well in the mixing step due to high melting points or low solubility in rubber compounds. These materials are not usually compatible with the finished unvulcanized elastomer, and indeed, also tend to interfere with the vulcanization step.

In part, the difficulty with adhesion of elastomers to a variety of substrates lies in the generally non-polar nature of most natural and synthetic elastomers which do not contain bonding species which can react or coordinate with the generally polar bonds at the interface with a mineral, fiber or metal surface. In addition, those surfaces that do not contain polar bonding surfaces are inert to most kinds of reactions which might provide adhesive interface with non-polar bonds. There are physical problems also in that the adhesive interface for this type of bond rarely contains bonding elements having the same coefficient of expansion, or the same elastic modulus, for example.

Methods to bring about satisfactory bonds have involved the following types of transformations:

a. Chemical methods to modify the elastomer interface by chemically altering the surface of the elastomer with polar bonds. This approach is exemplified by chlorination of the elastomer surface with sodium hypochlorite solutions or other forms of chlorine containing treatments as described by Schidrowitz, P. and Redfarn, C.A. (1935) J. Soc. Chem. Ind. 54:263T. Another approach is exemplified by treatment of the surface of polytetrafluoroethylene with sodium napthalide which is said to abstract fluorine from the surface leaving acetylide linkages which are more compatible surfaces for metal bonding. (Nelson, E.R. et al. (1958) Ind. Eng. Chem. 50:329.)

b. Chemical methods to modify the substrate interface by chemically altering the surface of the substrate with non-polar bonds. This approach is exemplified by treating the metal surface with primer systems designed to impart a bonding surface which is more compatible with non-polar elastomers. There are many commercial primer systems which are applied to a wide variety of bonding applications which use this technique. For example, see literature describing Lord Elastomer Products ChemLok ® 205 Rubber-to-Metal Adhesive Primer.

c. Physically modifying the substrate interface with a coating which bonds to both elastomeric and substrate surfaces with greater bonding energy than either alone can be made to bond. For example, sputter coated brass on steel wire, bonded with sulfur-cured rubber (Von Ooij, W.J. (1979), "Fundamental Aspects of Rubber Adhesion to Brass-Plated Steel Tire Cords," Rubber Chem. Technol. 52:605–675).

d. The combination of several of these techniques at once. Because bonding various surfaces is fraught with technical difficulties, combinations of methods is frequently used in commercial systems. These techniques may involve as many as seven treatment steps. For example, directions for the use of Lord Elastomer Products ChemLok ® 252 describes these steps.

The various bonding techniques described briefly above have been applied to these bonding problems in a bewildering array of methods, but in general have failed to provide either a truly satisfactory or a generally useful method. Several successful approaches have used some of the chemical reactions which occur during vulcanization to bring about a corresponding or similar reaction at the bonding surface. An example is the use of sulfur and sulfur donors which are principally added to participate in the vulcanization reactions to also participate with metal oxide or metal sulfide bonds on the substrate surface. This technique is described repeatedly in the scientific literature, for example in elastomer to brass coated wire adhesion. See, e.g., van Ooij, J. (1984) Rubber Chem. Technol. 57:421–456.

A milling process has been described, where chemical bonds have been broken between rubber fragments by mechanical shear forces which have reformed during milling in the presence of maleic anhydride to give a maleinized rubber. Such processes have found useful applications as described in Bacon, R.G.R. and Farmer, E.H. (1939) Rubber Chem. Technol. 12:200-209. An anhydride adducted rubber was described in 1944 for bonding natural rubber to artificial silk. (Kambara, S. et al. (1944) Soc. Chim. Ind. Japan 45:141-143; CA. 43, 1595 (1949)). The problem with this approach is that it is very difficult to obtain higher concentrations of chemically bound maleic anhydride in the rubber compound, the mechanical mixers used to obtain high mixing energy do not contain the odorous and toxic vapors of maleic anhydride in a satisfactory way, thus causing unsafe working conditions around the mixer, and the mixing energy needed to mechanically break rubber chains to bring about this reaction is unfortunately great.

Maleic adducts have long been known to the coatings industry where such natural oils as linseed and soya oil have been successfully maleinized and used commercially for many years. These natural drying oils have limited unsaturation content however, such that such vegetable oils cannot be highly maleinized. Most of these oils contain a maximum of three unsaturation sites which can be maleinized. Maleinized vegetable oils have been used as additives to rubber compositions, but the results have not been generally applicable or remarkable to adhesive bonds. Partly, these materials have limited solubility in rubber compounds, and this appears to limit their usefulness. These maleinized vegetable oils have proven useful in coatings, where the presence of the maleinized products have shown good film adhesion and have exhibited other useful coating properties.

Low molecular weight polybutadienes and other highly unsaturated polymers have been maleinized and used as chemical intermediates for the production of air dried coatings and electrodepositional primer coatings, and these products have been very useful for these purposes. Good adhesion properties are typically observed with these coatings. Medium molecular weight resins of this type have not been much in demand for the coatings industry partly due to the high viscosity of these systems, and have thus not been readily available. It is precisely this medium molecular weight range however which is most useful in the context of this invention.

A maleinized polyisoprene resin is described in U.S. Pat. No. 4,218,349 assigned to Kuraray, Ltd of Japan and is used in a sulfur cured natural rubber blend to provide improved green strength of the natural rubber compounds and, incidentally, to provide improved adhesion to metal. No mention of the adhesive property of such compounds with other elastomers and with other cure systems is given, except for blends with natural rubber comprising less than 35% of total rubber content of synthetic elastomer of greater than 300,000 molecular weight. A similar material is described in U.S. Pat. No. 4,204,046 also assigned to Kuraray, Ltd of Japan for use as a constituent of a pressure sensitive adhesive, but no description is given of this resin compounded with elastomers of any kind (compounds referred to as tackifiers, which are not considered to be elastomers, are described).

Kuraray Pat. No. 4,218,439 teaches that the physical properties and processability of the vulcanizate are decreased with excessive amounts of maleic anhydride. Applicants have observed that adhesion can be doubled or better over that of the Kuraray patent and that the more dicarboxylic acid (e.g., maleic acid) moiety present, the better the adhesion. In light of the Kuraray teachings it was surprising to find that both natural and synthetic rubber compositions could be prepared which retained physical properties and processability.

None of the foregoing disclosures teach an adhesive elastomeric composition comprising a polymeric dicarboxylic acid adduct wherein the polymer has a cis-1,4 content less than 70%, or wherein the polymer has a molecular weight less than 8,000. Moreover, none of the foregoing disclosures teach an adhesive elastomeric composition using synthetic rubber and not containing natural rubber, which comprises a dicarboxylic acid adduct.

SUMMARY OF THE INVENTION

We have discovered that alpha, beta-ethylenically unsaturated dicarboxylic acids and derivatives, e.g., maleic anhydride, which have been adducted to such unsaturated polymers as liquid polybutadiene or styrene butadiene resins can be compounded with unvulcanized elastomers of nearly all types to give very strong adhesion to other elastomers, plastics, metals, minerals, fabrics, fibers and miscellaneous substrates, following a vulcanization step. While many materials are known to promote adhesion between elastomers and other substrates, none appear to be as general as this new invention, such that nearly any elastomer or elastomer formulation can be made to exhibit very significant adhesion to a great variety of substrates. These new materials and formulations promote and contribute to adhesion of elastomers containing the adducted polymers, e.g., polybutadiene or polyisoprene homopolymers or styrene polybutadiene or styrene isoprene homopolymers copolymer resins in all the following categories:
  a) adhesion of elastomers to other elastomers;
  b) adhesion of elastomers to plastic materials;
  c) adhesion of elastomers to metal substrates, e.g., adhesion of natural, polybutadiene or styrene butadiene rubber to brass-coated steel wire;
  d) adhesion of elastomers to fabrics, fibers, paper and miscellaneous substrates; and
  e) adhesion of elastomers to glass, mineral fillers and coarse mineral substrates.

These compounds have many important uses such as tire construction for the purpose of improving the bonding of steel to tire cord, and in hydraulic hoses for a similar purpose to adhere the elastomeric layers to braided wire, nylon, polyester, etc. They are also useful in the bonding of rubber to metal inserts for seals and for the metal to elastomer interface in shock mounts and other elaborately engineered metal to elastomer items.

In addition, adhesion is promoted to a very significant degree between many unlike substrates when a film composed of any one of many different elastomers is compounded with adducted unsaturated polymers such as, preferably maleinized polybutadienes and/or maleinized styrene butadiene copolymer resins properly formulated or blended together. To exhibit maximum adhesion, the film must undergo a vulcanization step. This film may be conveniently in the form of a tape. Examples are steel to glass, polypropylene to leather, polycarbonate plastic to copper metal, filler surface to plastic, and metal to metal.

It is also possible to combine certain elastomers, polybutadiene or styrene butadiene resins, curatives such as soluble sulfur and accelerators or peroxides in solvents to form a curable system that may be painted or otherwise applied onto surfaces requiring treatment for adhesion. Surfaces treated in this way may then be placed in a press in contact with untreated surfaces and heated to cure resulting in enhanced adhesion between treated and untreated surfaces.

Other forms of use include the modification of gums, mastics, and sealants for better adhesion to substrates, or in the form of solvent solutions for improved adhesion as a solvent deposited film, or in compositions such as window sealants for the adhesion of glass to glass or metal.

It is an object of this invention to provide a method and composition for improving the adhesive bond between natural and synthetic rubber compounds and a variety of materials including other elastomers, plastics, metals, mineral materials, fabrics, paper and fibrous materials. This objective is accomplished by addition of polymeric anhydrides and selected derivatives of these polymeric anhydrides to elastomeric compounds during a compounding or formulation step prior to vulcanization or cure.

This invention, therefore, provides an uncured adhesive elastomeric composition comprising an adduct of an unsaturated polymeric dicarboxylic acid or derivative with an elastomer wherein the acid or derivative moiety of said adduct comprises at least about 3 weight percent of said adduct, up to the maximum amount possible to adduct, generally about 27–30 weight percent, and wherein said adduct comprises between about 2 and about 50 weight percent of said elastomeric composition.

It is also an object of this invention to improve formulations of elastomeric materials containing polymeric organic acid and derivative adducts so that the physical properties of the compounded elastomer when vulcanized are as close as possible to those obtained from the specific elastomer without the addition of the adducted material. As shown in the examples hereof, physical properties are decreased when excessive amounts of the adduct are used, but surprisingly, these physical properties may be adjusted to normal levels by the methods of this invention. This is especially true of sulfur-cured elastomers. Tensile strength is an important indicator of these physical properties. Additives for adjusting these properties to substantially normal levels include cure agents such as sulfur added in amounts in excess of that normally required for cure, and accelerators such as TBBS (N-tert-butyl-2-benzothiazole), TMTD (tetramethylthiuram disulfide), as well as other accelerators known to the art. Substantially normal levels in reference to physical properties of the cured elastomer means that the properties are within the ranges suitable for an elastomer useful for the normal purposes of said elastomer. The physical property-adjusting additives are used according to the guidance provided herein and principles known to those skilled in the art in amounts effective to adjust the physical properties of the cured elastomer to substantially normal levels.

When peroxides as known to the art are used as the curing agent, it has been discovered that the physical properties of the cured elastomer are not substantially decreased when the adduct contains a high vinyl content. It is known to the art that high vinyl content improves the physical properties of peroxide-cured elastomers. The use of excess curing agents and cure accelerators is not generally effective for adjusting the physical properties of peroxide-cured elastomers. In combination with the adducts described herein, however, when it is desired to achieve a peroxide-cured adhesive elastomer with good tensile strength and other physical properties, the vinyl content may be adjusted as known to the art.

It should be appreciated that high values for the physical properties of the cured elastomer are not essential in all cases.

The terms "cure" or "vulcanization" are art-recognized terms as applied to elastomers and mean that sufficient cross-linking of the elastomer has occurred so as to, e.g., provide a maximum torque reading (MH) when tested on a standard oscillating disk rheometer (ODR) at a chosen constant temperature. The process of curing or vulcanization results in a material that has great toughness and good strength which will not soften too much on heating. An uncured elastomeric composition of this invention is one which has not been subjected to vulcanization, but which is capable of being cured.

An uncured adhesive elastomer of this invention is one capable of adhering to a substrate when cured in contact with such a substrate. Adhesion is measured by means known to the art, for example, ASTM D-816-70 lap shear tests, D2229-73 adhesion to steel cord, and D2630-71 strap peel test. The adhesive elastomers of this invention exhibit superior adhesive properties, in the range of between about 450 and about 1200 psi in lap shear or greater to steel surfaces, between about 250 and about 1000 psi or greater to other elastomeric surfaces.

The elastomers which may be cured and derive benefit of adhesion to most substrates as a result of this invention include all those natural and synthetic rubbers which are normally vulcanized with a cure package consisting of sulfur and sulfur donors including cure rate accelerators along with additives such as antioxidants, antiozonants, process aids, plasticizers, mineral extenders, reinforcing fillers, cure rate enhancers or inhibitors etc. which are considered a part of the art practiced in the vulcanization of such elastomeric materials.

Sulfur-curable elastomers useful in the practice of this invention include, but are not limited to, polyisoprene rubber (IIR), polybutadiene rubber (BR), styrene butadiene rubber (SBR), butyl rubber (IIR), acrylonitrile butadiene rubber (NBR), hydrogenated acrylonitrile butadiene rubber (HNBR), ethylene propylene diene rubber (EPDM), chlorobutyl rubber (CIIR), bromobutyl rubber (BIIR), polychloroprene rubber (CR) and chlorosulfonated polyethylene (CSM), and blends of two or more of such elastomers.

Other elastomers which derive benefit from adhesion as described in this invention are those which are cured with peroxide catalyst or other such free radical producing catalysts, referred to herein as peroxide-type curing agents, including cures containing crosslinkers, coagents, plasticizers, reinforcing fillers, antioxidants, antiozonants, and other modifiers and additives normally recognized as part of the art involved in the compounding and vulcanization of such elastomers. The group of elastomers comprising the latter group include but are not limited to ethylene propylene rubber (EPR), ethylene propylene diene rubber (EPDM), acrylonitrile butadiene rubber (NBR), natural rubber (NR), hydrogenated NBR, fluorosilicone rubber (FVMQ), fluorocarbon rubber (FKM), e.g., of a type designated for peroxide cure such as Viton G from DuPont, silicone rubber (VMQ), chlorinated polyethylene (CPE) and fluorophosphazene rubber, e.g., Eypel-f from Ethyl Corp.

Additional elastomers included within the categories of elastomers which benefit from this invention are polychloroprene, chlorinated butyl, brominated butyl, and chlorosulfonated polyethylenes. Many of these latter materials may be cured with ethylene thiourea (ETU) as a vulcanization accelerator, but in fact do not require ETU in the presence of the maleinized polybutadienes or maleinized styrene butadiene copolymer to bring about vulcanization because the maleinized resins bring about vulcanization without this aid. Neoprene types T, W, and G may all be effectively cured by heating the polychloroprene in the presence of the polymeric anhydrides described in this invention. Most other polychloroprene elastomers ordinarily used to make molded or extruded articles, adhesives and coatings, can be cured by the adducts described in this invention. This does not include aqueous latexes, since the presence of moisture brings about hydrolysis of the anhydride and deactivates the organic acid adduct as an accelerator.

Elastomers which are normally vulcanized using amines or polyamines to promote crosslinking, all as known to the art, are not effectively cured in the presence of the polymeric adducts due to preferential reaction of the curative with the polymeric adduct. These materials include many acrylic rubber materials, and some fluoroelastomers.

Monomeric linear and cyclic anhydrides are not useful for the purposes of this invention because these generally low molecular weight materials have high vapor pressures and for this reason are toxic and difficult to work with during compounding and vulcanization processes normally encountered in the use of elastomers. Polymeric linear anhydrides may be produced from dicarboxylic acids by heating the acids in the presence of catalysts such as barium and thorium hydroxides, but these materials are not adequate materials for the enhancement of adhesion as taught by this invention due to low solubility in rubber compounds in general, and more importantly due to chemical decomposition into water vapor, carbon dioxide and cyclic ketones during compounding and vulcanization steps. The unsaturated polymeric compositions useful in this invention for adducting with dicarboxylic acid or derivatives are viscous liquids having a molecular weight between about 400 molecular weight units and about 1,000,000 molecular weight units. Polymeric compositions having a molecular weight between about 1600 and about 30,000 molecular weight units are preferred. When the polymer, e.g., polyisoprene, has a cis-1,4 content of about 70% or less, it is preferred that the molecular weight be less than about 8,000.

As will be appreciated by those skilled in the art, the processability of the uncured composition can be adjusted by adjusting the molecular weight of the polymeric composition, and, e.g., in the case of polyisoprenes, the cis-1,4 content. The amount of dicarboxylic acid or derivative affects the viscosity. As the amount of dicarboxylic acid or derivative is increased, the adhesive properties of the composition are increased, along with the viscosity of the uncured composition. The processability of the composition may then be adjusted by altering molecular weight of the polymer.

When the elastomer used is or comprises natural rubber, e.g., up to about 65% natural rubber, and the polymer is polyisoprene or a similar polymer having a cis-1,4 content less than about 70%, the polymer should have a molecular weight less than about 8,000.

Applicants have found that synthetic rubbers may also be used and synthetic elastomers are in many ways preferable to make the adhesive elastomeric compositions of this invention, and amount of adduct used, molecular weight and cis-1,4 content of the polymer used, and other additives may be adjusted in accordance with the teachings of this invention to achieve desired adhesive properties without loss of tensile strength and other physical properties. Principles known in the art such as plasticizers and process aids may also be used to adjust viscosity and processability of the compositions.

Polymeric adducts marginally useful for the purpose of this invention are maleic or other similar dicarboxylic acid or derivative adducts of naturally-occurring unsaturated drying oils. Examples of this type of oil are linseed oil, tung oil, soy oil and other naturally-occurring oils commonly used in the coatings industry to manufacture air drying paints and coatings. Maleinized drying oils are commercially produced and used in the paint and coatings industry but for the purpose of this invention, the content of maleic anhydride in these commercial oils is relatively low compared to the plasticizing potential of the polymer oil, which renders them less useful than the polymeric resin compositions preferred as adduct components of this invention. Nevertheless, these materials promote some adhesion in elastomeric compounds.

Another naturally-occurring material which can be adducted to dicarboxylic acids or derivatives to produce accelerators is cashew nut oil. Other types of materials are unsaturated dimers and trimers made by heating tall oil and maleating by procedures known to the art.

There are also synthetic drying oils known to the art, from which drying oil-acid anhydride adducts may be produced. Synthetic drying oils or resins which are preferred for the purposes of this invention are made by polymerization of isoprene, butadiene, myracene, cyclopentadiene, and higher homologs up to about $C_{20}$, or copolymers of these monomers with each other in any ratio, or copolymerized with many other vinyl reactive monomers such as styrene, vinyl toluene, divinyl benzene, vinyl chloride, vinylidene dichloride, acrylonitrile etc. The polymers made in this way may then be adducted by heating with maleic anhydride, maleic acid, fumaric acid, diesters of maleic or fumaric acid, substituted and unsubstituted maleamides or maleimides or other alpha, beta-ethylenically unsaturated dicarboxylic acids and/or anhydrides and other derivative as defined herein, under conditions described in the scientific literature, and known to the art, e.g., Trivedi, B.C. and Culbertson, R.M. (1982) in *Maleic Anhydride*, Chapter 5, "Ene Reaction," Plenum Press, NY, pp. 147-176.

The polymeric adduct which is a preferred embodiment of this invention is made by reacting a polymeric resin such as a polybutadiene homopolymer or copolymer of styrene and butadiene with an organic acid anhydride such as maleic acid anhydride. These adducts are non-toxic, provided that monomeric, unreacted maleic anhydride is not present or is removed to a substantial degree.

The polymer may be any polymeric resin capable of forming an organic acid or derivative adduct and solubilizing in the elastomeric cure mixture. A preferred polymeric resin is an unsaturated polymer comprising at least one monomer which is a conjugated diene containing 4–12 carbon atoms. The polymer may additionally comprise a monomer which is a vinyl substituted aromatic compound containing 8–20 carbon atoms. Polybutadienes are preferred polymers. A preferred polymer is a random 1,2 or 1,4 polybutadiene homopolymer preferably containing from about 20 to about 90 percent 1,2 vinyl groups. Unless specified otherwise, as used herein all percents are weight percents. Preferably the polymer comprises a mixture of 1,2 and 1,4 modes of addition and contain cis and trans unsaturation in the backbone of the polymer chain and vinyl unsaturate pendant to the polymer chain. Polyisoprenes, substituted polybutadienes, styrene butadienes, and styrene isoprene co-polymers are all useful for purposes of this invention.

Polymer molecular weights in the range of 4,000 to 30,000, while viscous, are not difficult to handle in rubber mixers of various kinds, and may be manufactured readily. These materials have rubber like chains which are quite compatible with most elastomers, and blends to 15% or more may be easily mixed. Adduction of these resins as described herein requires proper equipment design, but otherwise can be readily produced at acid moiety contents as high as 20%. Higher acid moiety concentrations can be achieved, but the equipment design for proper results becomes more difficult. Resin molecular weights in excess of 60,000 require reaction equipment more akin to extruders and intensive mixers, and are not suitable for purposes of this invention.

The adduction process taking place on lower molecular weight unsaturated resins may be easily handled and reacts very cleanly without consumption of massive amounts of energy in an enclosed reactor to give molecules which are not too large to handle in the form of a liquid or a low melting solid. Since the reaction can be forced to completion, there is little or no residual acid or derivative remaining in the product. The products themselves have high vapor pressures, and there is no evidence that they are toxic. It is not necessary with our system to charge the acid or derivative to a heated mechanical mixer or extruder where problems with vapors leaking through seals and vents can be severe, since the vapors, particularly maleic anhydride vapors, are toxic and corrosive to human skin, this procedure is to be avoided. In addition, quite high acidic concentration can be attained which allows formulation with acidic contents much higher than those obtainable by the mechanical process.

The terms "polymer" and "polybutadiene polymer" as used herein include substituted polymers bearing non-interfering groups such as styryl, and nitrile. These non-interfering groups do not prevent vulcanization reactions of elastomers nor adversely affect the properties of the cured elastomer.

The organic acid or derivative used to make the adhesive promoters (adducts) of this invention may be any alpha, beta-ethylenically unsaturated dicarboxylic acid or its anhydride or imide or amide derivatives, capable of adducting to the polymer, and preferably is maleic anhydride. This moiety is capable of being adducted at weight percent levels of less than 1% to as much as about 30%. Preferably the anhydride moiety comprises between about 3 and about 17% of the adhesive promoter.

The amount of adhesion promoter to be added to the elastomeric formulation is sufficient to effect the desired adhesive bond of the elastomer to the substrate and still provide an elastomer with satisfactory physical and chemical properties without adversely affecting the vulcanization rate and the ultimate cure of the elastomeric compound. Preferably, the adhesion promoter comprises between about 2 and about 10% of the cure mixture, but may comprise up to 50% of the cure mixture for special applications.

The method of making the curable adhesive elastomeric compositions of this invention comprise:
  (a) reacting an unsaturated polymer as described above with a dicarboxylic acid or derivative to form an unsaturated polymeric dicarboxylic acid adduct wherein said acid or derivative moiety comprises at least about three weight percent of said adduct; and
  (b) adding said adduct to an uncured elastomer in an amount between about 2 and about 50 weight percent of said uncured adhesive elastomeric composition.

When the elastomer comprises natural rubber the polymer should have a cis-1,4 content less than about 70%.

Curing agents may also be added to the mixture but ma not be necessary when the elastomer is one which may be cured by the adduct, e.g., polychloroprene rubber (CR), chlorobutyl rubber (CIIR), bromobutyl rubber (BIIR), chlorosulfonated rubber (CSM), epichlorohydrin rubber (ECO), chlorinated polyethylene rubber (CPE), polyvinyl chloride (PVC), and chlorinated natural rubber (CNR).

The adducted polymer must be milled into the rubber prior to vulcanization for optimum results. The best results are obtained when about 5–15 phr of the polymer is used per hundred parts of the other elastomeric material The unvulcanized rubber is then injection molded or extruded, then heated to bring about cure. This cure is normal from the standpoint of the rubber and how it cures, but at concentrations of more than 5 phr, adducted polymers behave as plasticizers, and the overall physical properties of the vulcanized rubber is about equivalent to adding similar quantities of plasticizing oils. There is now extensive data on adhesive strengths of this vulcanizing system when used with many different elastomers, metals and plastics as demonstrated in the Examples. We have demonstrated that the adhesion in not due to undercured rubber, as is sometimes the case.

Elastomers useful in this invention include to be cured natural rubber (NR) polyisoprene rubber (IR), polybutadiene rubber (BR), styrene butadiene rubber (SBR), butyl rubber (IIR), acrylonitrile butadiene rubber (NBR), ethylene propylene diene rubber (EPDM), ethylene propylene rubber (EPM), silicone rubber (VMQ), fluorosilicone rubber (FVMQ), chlorinated polyethylene (CPE), crosslinked polyethylene (XPE), polychloroprene rubber (CR), chlorobutyl rubber (CIIR), bromobutyl rubber (BIIR), chlorosulfonated polyethylene (CSM), hydrogenated acrylonitrile butadiene rubber (HNBR), epichlorohydrin rubber (ECO), tetrafluoroethylene-propylene copolymer (trade name Aflas), and polyvinyl chloride (PVC), and mixtures thereof.

A potential problem in using this technology is adhesion of the elastomers to rubber molds. In most cases, there is quite high adhesion to certain polished steel and aluminum parts, but the molds used to prepare the laboratory sheets are ferrochromed to a mirror like finish, and these molds have been used to make acceptable parts, after judicious application of mold releases. Not all industrial molds are so polished. For example, there have been some notable problems removing the rotors from the Monsanto Rheometer, which is not highly polished. In many cases, the proper application of mold release can solve the mold adhesion problem.

Adhesion of this system to most plastic and elastomeric materials is very great. In many cases, it can be used as a tie coat between two thermoplastics, provided that the thermoplastic will resist the cure temperature of the elastomer. Very good adhesion has been noted between NBR and woven cotton, nylon and polyester fabric.

The compounds and methods of this invention are uniquely useful because the compounds are based on liquid rubber materials which have chemical structures identical to many synthetic elastomers except for molecular weight, and are very similar to many elastomers from the standpoint of polarity. These materials undergo vulcanization by the same chemical curatives commonly encountered in the rubber industry under nearly identical conditions and after vulcanization become a part of the working elastomer. They can have attached or adducted considerable amounts of carboxylic acid functionality without becoming unduly difficult to handle and are compatible with most common elastomeric materials. They do tend to plasticize the formulated rubber compound and they can contribute to change in physical properties of the vulcanized elastomer which may sometimes result in undesirable physical properties. Fortunately, these disadvantages can be overcome by simple modifications of the formulation and changes in the curative package.

The cured elastomers containing the adhesion promoter compositions of this invention have excellent properties especially if adjustments have been made in the composition of the cure package to optimize these properties. In general, tensile strength, elongation, modulus, compression set, hardness, oil swell, tear strength, resilience, etc. are all within the normal parameters expected of a well-cured elastomer. Certain properties, especially those of adhesive bond strength, are greatly improved over the original. (See Examples 4 through 11.) Other physicals such as heat resistance, low temperature behavior, cure rate index, die swell, etc., depend on the particular elastomer and the formulation of that elastomer, but may be improved to be comparable to the normal well-cured elastomer.

Tensile strength and other physical properties are improved in the cured adhesive elastomers of this invention by the addition of extra amounts of curing agent including sulfur, thiazoles, thiurams, sulfonamides, dithiocarbamates and xanthates with chemical structures specifically designed for the curing of rubber. Amounts of curing agents necessary for curing particular elastomers are well-known to the art, and amounts of from about 20 to about 200% over these amounts are effective for adjusting physical properties to normal. A number of physical properties including tensile strength, elongation, modulus, hardness, oil swell, tear strength, and compression set are favorably adjusted by increasing the amount of curing agent. References to agents for increasing tensile strength herein will be understood to include such agents in their capacity as agents for adjusting said other physical properties as well.

In addition to the use of extra curing agents, it has been discovered herein that addition of N-tert-butyl-2-benzothiozole sulfonamide (TBBS) in an amount of about 0.2 to about 3 phr, and/or of tetramethylthiauram disulfide (TMTD) in an amount of about 0.2 to about 3 phr specifically acts to counteract the plasticizing effects of the adduct in the mixture and bring tensile strength and the other physical properties to normally acceptable ranges.

DETAILED DESCRIPTION OF THE PREFERRED EMBODIMENTS

This invention provides the adhesive user with polymeric materials, preferably polybutadiene, styrene butadiene or polyisoprene liquid resins, which have been adducted with unsaturated dicarboxylic acid or derivatives, e.g., anhydride (preferably maleinized) to yield polymeric organic acid and derivative adducts which can be used to give very good adhesion between elastomers and a variety of other substrates. These adhesion promoters are of low toxicity and provide cure rates and scorch times comparable to those of compounded elastomers without the adhesion promoters. In those applications which require contents of adhesion promoters whereby the elastomeric compound is effectively plasticized and thereby does not have the required cure rates or physical properties as a cured elastomer, relatively small changes in the compound, such as content of other plasticizers, fillers and concentrations of accelerators and curative can be made which will correct the plasticizing effect of the anhydride adduct on the rubber compound and return the physical properties to or near normal values for the cured elastomer without the adduct.

The elastomers useful in the practice of this invention comprise natural rubber and most of the synthetic elastomers known to the trade and include virtually all the elastomers known to be vulcanizable with sulfur and accelerators. Also included in this category are those elastomers normally vulcanizable with peroxide catalysts. Any elastomer capable of being cured by means of cross-linking reactions accelerated by ethylene thiourea, such as polychloroprene, are also included in the category of elastomers useful in the practice of this invention such as polychloroprene. Additional ethylene thiourea curable elastomers include chlorobutyl rubber (CIIR), bromobutyl rubber (BIIR), chlorinated natural rubber, chlorinated synthetic rubbers and ethylene chlorohydrin rubber (ECO) and are considered to be within the scope of this invention. Preferably the elastomer has sufficient structural similarity to the adducted resins so as to allow solubilization of the resins in the elastomer, all as will be readily apparent to those skilled in the art.

The unsaturated liquid rubber-like adducts of this invention are preferably polymeric organic acid anhydrides and anhydride adducts. They are comprised of a polymeric "backbone" bearing organic acid anhydride moieties, either attached as pendant anhydride groups, e.g., maleic anhydride moieties, sucinnoyl anhydride moieties, or as end groups on an unsaturated polymeric chain. The polymers or polymeric units used to make the adducts of this invention preferably have sufficient unsaturation present in the backbone structure to provide sites e.g., alpha carbons, for adduction of enough organic acid or derivative moieties to provide adhesion promotion during the cure reaction.

Preferably, the polymer resin minus the acid moieties has a molecular weight sufficient to provide a final adducted product with a vapor pressure high enough so as to avoid excessive vaporization of the adduct during the curing process, as will be evident to those skilled in the art, of between about 400 molecular weight units and about one million molecular weight units, preferably between about 800 molecular weight units and about 30,000 molecular weight units, and more preferably between about 1600 molecular weight units and about 12,000 molecular weight units.

Any polymer or polymeric unit having the requisite properties and parameters as discussed above may be used. Preferably the polymer is a polybutadiene such as a random polybutadiene polymer containing both 1,4 and 1,2 butadiene units. The ratio of 1,2 vinyl and 1,4 cis and trans double bonds in the polymer can be from about 15 to about 90% 1,2 vinyl, and preferably from about 20 to about 70% 1,2 vinyl. Suitable polymers are commercially available, e.g., the Ricon (trademark of Colorado Chemical Specialties Co., Golden, Colorado) resins as described in R. E. Drake (January 1982) "Property Modifications of EPDM Rubber with Liquid 1,2-Polybutadiene Resins," Elastomerics, pp. 28-34.

The butadiene polymers used in the present invention are preferably butadiene polymers containing a large proportion of 1,2 double bonds or a large proportion of 1,4 double bonds or large proportions of both 1,2- and 1,4 double bonds. The butadiene polymers and copolymers which are prepared by polymerizing butadiene alone or with other monomers in the presence of alkali metal or organic alkali metal as catalyst, are typical ones used in the present invention. In order to regulate the molecular weight, to reduce the gel content and to form a light-colored polymer, the polymerization is typically a living polymerization which is carried out in a tetrahydrofuran medium or a chain transfer polymerization in which ethers such as dioxane and alcohols such as isopropyl alcohol are added and aromatic hydrocarbons such as toluene and xylene are used as the chain transfer agent as well as the solvent. A polymer in which most of the double bonds in the butadiene units are 1,2 double bonds and which can be used in the present invention can be prepared by polymerizing butadiene alone or with other monomers in the presence of a catalyst comprising a compound of a metal of group VIII of the periodic table and alkyl aluminum. Other polymerization techniques are known to yield polymers having acceptable properties, for example, the free radical polymerization of butadiene using lauryl peroxide as the catalyst.

Examples of copolymers useful in the present invention are copolymers of butadiene with conjugated diolefins other than butadiene such as isoprene, 2,3-dimethylbutadiene and piperylene or with vinyl substituted aromatic compounds such as styrene, alpha-methyl styrene, vinyltoluene and divinylbenzene as the co-monomers. Butadiene copolymers containing less than 50 percent by weight of said co-monomers, and more particularly containing less than 30 percent by weight of said co-monomers may be preferably used.

Further, in the present invention, modified products of the butadiene polymer or copolymer which are prepared by heating and partially oxidizing the butadiene polymer or copolymer by passing air through the heated polymer or heated polymer dissolved in appropriate solvents such as xylene or kerosene in the presence of carboxylic acid metallic salts such as cobalt naphthenate or manganese octanoate, or prepared by thermal treatment of the butadiene polymer or copolymer in the presence of an organic peroxide, may also be used, although the extent of such oxidation must be of such nature so as not to comprise overly reactive sites such as alcohol or glycidyl ether.

Other polymeric compositions useful in the practice of this invention will be readily apparent to those skilled in the art. Polymers similar to polybutadienes such as polyisoprenes and natural drying oils, e.g., tall oils and linseed oil which are capable of forming acid or derivative adducts are considered equivalents of the above-described polybutadiene polymers for purposes of this invention.

The polymers useful in this invention may bear additional groups such as styrene moieties, which contribute to the physical properties of the polymer but will not interfere with the polymer's ability to form organic acid anhydride adducts, or with the ability of the final product to form strong adhesive bonds between elastomer and substrate or to interfere with the vulcanization reaction for the formulated elastomeric compound containing the anhydride adduct. Many such non-interfering groups will be readily apparent to those skilled in the art, and include methyl, ethyl, benzyl, tolyl, cyclohexyl, etc., and non-highly-reactive substituents (oxygen or halides), and non-bulky substituents such as cyano or fluoro. The adducted unsaturated resins of this invention may comprise up to at least about 50 percent by weight of such substituents, i.e., styrene, without interfering with the ability of the material to effect the adhesion of the elastomers.

The organic acid or derivative moieties of the adhesion promoters of this invention may be any which are adductable to the polymers or polymeric units described above. Maleic anhydrides are especially suitable, however other organic acids, anhydrides and derivatives capable of being adducted to the polymeric backbones described herein are known to the art or may be ascertained without undue experimentation.

Adductable materials useful for the formation of organic anhydrides pertaining to this invention are alpha, beta-ethylenically unsaturated dicarboxylic acid compounds which may be represented by the following general formula:

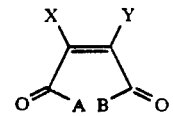

in which X and Y are hydrogen atoms or alkyl groups, and may be the same or different; and A and B are hydroxyl groups, alkoxyl groups, alkyl substituted amine groups or an —O— bond formed by linking A and B together through a bonded oxygen or an—N(-R)— bond, where R may be alkyl or hydrogen, formed by linking A and B together through an imide linkage. Said alpha, beta-ethylenically unsaturated dicarboxylic acid compounds include anhydrides of maleic acid such as maleic anhydride, and esters of maleic acid such as monomethyl maleic acid, dimethyl maleic acid and diethyl maleic acid, and those having 12 or less carbon atoms in each molecule may be most advantageously used. Such alpha, beta-ethylenically unsaturated dicarboxylic acids and derivatives are considered equivalent to maleic acid anhydride for purposes of this invention. Such derivatives may also include maleamides such as N,N'-dimethyl diamide of maleic acid, and maleimide.

Adduction of maleic anhydride and materials similar to maleic anhydride to unsaturated polymers may be of several types. In those situations where the adductable resin contains conjugated unsaturation, a principal product of the adduction may be those commonly described as Diels-Alder products which result from a concerted ring closure mechanism. Typically, the Diels-Alder reaction results in products which have double bonds conjugated with a carbonyl double bond and these products are prone to undergo a "retro" Diels-Alder reaction. As a consequence, these products are not particularly stable to heat and light. A more desirable adduction mechanism which probably involves a cyclic intermediate of a different type is known as the "ene" reaction. Both the Diels-Alder and "ene" reactions are exhaustively treated in the book by B.C. Trivedi and B.M. Culbertson, (1982) *Maleic Anhydride*, Chap. 4 and 5, Plenum Press, New York. The "ene" reaction does not require conjugated unsaturation and results in a cyclic saturated five-membered anhydride ring pendently attached to the polymer chain. This saturated five-membered cyclic anhydride is therefore a succinoyl anhydride moiety. In an unsaturated polymer chain of 10,000 molecular weight which has been adducted with 20 weight percent maleic anhydride, a single chain may have as many as 20 pendant succinoyl anhydride groups attached to the chain. The accepted mechanism for the "ene" reaction results in a product which contains the same number of unsaturated bonds as the starting compound. The desired product for this invention appears to be the result of an "ene" reaction, although products resulting from the Diels-Alder mode of addition may also be present in the reaction mixture. It is the reaction mixture and not purified resin which is the useful product and is the subject of this invention.

The acid anhydride or other acid derivative moiety preferably comprises the maximum that can be adducted to the polymer, usually about 27-30% by weight. Amounts between about 3% and about 17% are also useful. The polymeric backbone is reacted with the organic acid anhydride to make the adducts of this invention by methods known to the art. When the organic acid anhydride is maleic anhydride, and the polymer is a polybutadiene polymer the reaction is carried out according to the teachings of U.S. Pat. No. 4,176,109 issued Nov. 27, 1979, which is incorporated herein by reference.

In general, other polymers may be reacted with maleic acid anhydride or other alpha, beta-ethylenically unsaturated dicarboxylic acids or derivatives by analogous methods, as will be apparent to those skilled in the art. Critical factors in carrying out such reactions are the quantities of reactants, the amount and type of polymerization inhibitor(s) used, the amount of solvent (if any), the maintenance of a non-reactive gas in the vapor space of the reaction vessel, and the temperature and time used for the reaction. Quantities of reactants are chosen such that the amount of acid anhydride or other derivative is between 1 and 30% of the polymeric resin by weight, a polymerization inhibitor(s) is/are chosen from a large class of compounds which inhibit free radical polymerization of the polymer or copolymer. The inhibitor(s) chosen may be from any of the following classes of materials, (1) phenols and alkyl substituted phenols, especially those which have bulky substituents on the aromatic ring; (2) hydroquinone and substituted hydroquinones; (3) aromatic diamines and substituted aromatic diamines; (4) catechol derivatives; (5) pyrogallol derivatives; (6) quinoline derivatives; (7) N-nitrosoamines; and (8) naphthol derivatives. There is a large body of art concerned with the selection of such inhibitors, which is not a principal issue connected with this invention. One, or several inhibitors may be chosen from any of the classes of compounds, or preferably from more than one class. Solvent may be used to keep viscosity of reactants in a desirable range and should be chosen for non-reactivity and boiling range, e.g., xylene. These reactions may be successfully carried out without any solvent whatever if desired.

In the preferred embodiment of this invention involving the reaction of a polybutadiene random copolymer and maleic acid anhydride, the reaction product corresponds to the following general formula:

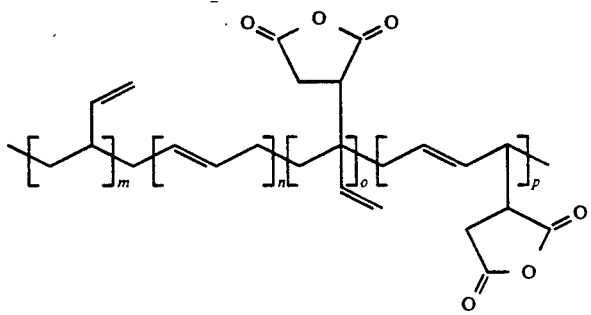

The ratio of m and n to o and p can be any ratio providing a sufficient amount of the acid or derivative moiety to affect the adhesive properties of the cured elastomer to the desired degree, and can be from between about 1:1 and about 30:1 and preferably is between about 3:1 and about 20:1.

The adhesion promoters of this invention are compounded into elastomers by one of several methods well-known to the rubber industry. These methods include roll mill and intensive internal mixers of the Banbury type. After compounding, the rubber material may either be used immediately or stored for use at a later time. The techniques of formulating with these adhesion promoters are similar to those commonly encountered in mixing such often used materials as plasticizing oils. Indeed, these adhesion promoters can replace some of the plasticizers normally used in rubber compounding since they provide similar plasticity to the rubber mix as do plasticizing oils prior to vulcanization. Most elastomers can be compounded during the formulating and mixing operations with cure packages quite similar to those used for the particular elastomer when no adhesion promoters corresponding to the materials of this invention are used. Methods for curing elastomers are described, for example, in *Science and Technology of Rubber*, Chapter 7, "Vulcanization," Frederick R. Eirich (ed.), pp. 291-338.

There are, however, differences in the cured elastomers of this invention as compared with elastomers not containing the polymeric adducts described here. These differences require some adjustment of the compounds. The primary difference is that the adducted polymer behaves as a plasticizer as mentioned above, and it is often desirable to reduce the amount and kinds of plasticizing oils present. Even with this adjustment, the vulcanization step produces a cured rubber product which has physical properties which may be somewhat altered. Generally, the cured material behaves as if it is plasticized. Adjustments are sometimes needed in the direction of increasing the amount of sulfur and accelerator present in the rubber compound or alternatively to change the type of accelerator to compensate for this increased plasticity. Generally, small increases in the amounts of these vulcanization materials will result in a rubber compound having quite similar physical properties to the original except that the adhesion of the rubber compound to substrates is dramatically increased.

The adhesion promoters of this invention provide acceptable to superior scorch times. The "scorch time" in a cure process is defined as the time from which cure is initiated in a standard ODR to a rise in torque as shown in a rheometer curve to one (TS1) or two (TS2) percent of the ultimate torque attained at full cure. The uncured but compounded elastomer mixtures have adequate storage stability when adhesion promoters of this invention are used. "Storage stability" is defined as that property of the compounded elastomer which is resistant to change with time in storage. As is known to the art, storage times of from about 1 day to about 180 days are adequate.

The cured elastomers of this invention containing the adhesion promoter compositions described herein have superior properties of adhesion to many different elastomers, plastics, metals, mineral fillers, fibers, fabrics ceramics and other miscellaneous substrates. The vulcanized elastomer has adequate to superior compression set, oil swell, and resilience, including superior properties of heat and cold resistance, depending upon the composition of the elastomer compound and the purpose for which the elastomeric compound was designed and formulated. "Compression Set" is defined as the percentage failure of the elastomer to return to its original state after being compressed at standard times and temperatures. "Oil swell" is defined as the amount of swell in standard ASTM oils numbers one and three. "Resilience" is a complex property partly defined by the response of the cured elastomer to a standard rebound test. "Heat resistance" is defined as the amount of retention of properties of elongation, modulus, tensile strength, compression set, and other properties after aging in an air oven at standard times and temperatures. "Cold resistance" is defined by various data showing the minimum temperature at which the cured elastomer has useful properties as an elastomer.

The cure mix, in addition to the elastomer to be cured and the adhesion promoters of this invention, may contain other components and additives known to the art such as: various grades of reinforcing carbon black; mineral or white fillers such as clay, silica, etc.; various metal oxides, such as zinc oxide, magnesium oxide, calcium oxide, lead oxide; sulfur; TMTD, TMTM and other co-accelerators; antioxidants; various plasticizers, such as oil, resin, esters, etc.; and various inert fibers, such as nylon, jute, keramid, fiber glass, etc. Certain reactive compounds such as diethylene glycol and many amines should not be used since they will react with the acid or derivative functionality of the adhesion promoter of this invention, all as is well-known to those skilled in the art.

In preferred embodiments, the adhesion promoters of this invention comprise between about 2% and about 15% of the total cure mix, more preferably between about 3% and about 12%, and most preferably between about 4% and about 8%.

In curing with the adhesion promoters of this invention, the temperature must be high enough to provide a flowable mix, but not so high as to bring about decomposition of the compounded elastomer, the accelerator or other components, e.g., between about 130° and about 175° C. This cure temperature will usually be similar to that at which the rubber would normally be cured without the introduction of the adhesion promoter. In certain cases it has been noted that a more desirable vulcanization temperature is 10° or 15° C. below the normal cure temperature for the particular elastomer and cure package under consideration.

Applicants do not wish to be bound by any theory as to the mechanism of action of this invention. However, it appears that when a molecule which contains numerous reactive polar sites (e.g., an acidic anhydride) is adducted to a rubber-like chain and added to the rubber compound during formulation of the rubber mixture, the adduct is crosslinked into the elastomer during vulcanization, but the polar sites do not necessarily participate actively in the vulcanization reaction. However, under vulcanization conditions the polar sites do participate in bonding reactions or at least polar attractions with more polar substrates resulting in a remarkable bond with the polar substrates. It is apparent from data supplied in the Examples hereof that there is also significant bonding taking place at non-polar substrate surfaces. This adhesive bond may be the result of vulcanization chemistry acting on the substrate to be bonded, or chemistry which is not yet well understood which may allow the very reactive anhydride which is a feature of the polymeric system to be described herein to become chemically attached to certain non-polar substrates such as polyethylene.

The following Examples are provided by way of illustration, not by way of limitation of this invention, which is defined by the scope of the claims appended hereto.

EXAMPLES

Example 1

Preparation of Maleic Acid Anhydride Adduct of 1,2-Polybutadiene 6518 grams liquid 1,2-polybutadiene homopolymer having a number average molecular weight of 2200 and a viscosity of 4000 poise (25° C.), 283 grams of o-xylene, 652 grams of maleic anhydride, and 13.2 grams of Irganox 565 (Ciba-Giegy) was added to a 12-liter stirred glass flask, provided with an electric motor-driven stirrer. The air in the flask was displaced with nitrogen gas; a nitrogen blanket was maintained on the flask at all times during the reaction by means of a positive flow of nitrogen gas through a xylene bubbler. The contents of the flask were heated to 185° C. (reflux) and held under these conditions for four hours. During this time, the temperature required to maintain reflux increased to 200° C. At the end of the heating period, a vacuum was placed on the flask, and xylene and residual maleic anhydride were distilled off at 150° C. and pressure of 1 mmHg. 7160 grams of a dark brown to red viscous oil remained in the flask, representing a yield of 99.7% of theory. This product is the polybutadiene maleic anhydride adduct, and is quite pure except for about 0.03% by weight of unreacted maleic anhydride, as determined by extraction with hot water and titration with dilute sodium hydroxide solution.

Example 2

Preparation of Maleic Anhydride Adduct of 1,4-Polybutadiene 6283 grams liquid 1,4-polybutadiene homopolymer having a 1,2-vinyl content of 23%, and combined cis and trans 1,4-unsaturation of 77%, and having a molecular weight average of 5500 and a viscosity of 350 poise at 25° C., 628 grams of maleic anhydride, 350 grams o-xylene, 2.0 grams Irganox 565 (Ciba-Giegy) and 6.0 grams Ionol antioxidant were added to a nitrogen purged 12-liter glass reaction flask. The flask was equipped with an electric heating mantle and an electric motor driven mechanical stirrer. In addition, it was equipped with a reflux condenser, and was maintained at all times under a positive nitrogen pressure in order to avoid contact of the reactants with air. The flask was heated by means of the electric mantle to a temperature of 175° C. and held at this temperature for a period of 5 hours and 20 minutes. The temperature was then increased rapidly to 213° C., and a vacuum of 1 mmHg was applied to distill off o-xylene and residual maleic anhydride. 6728 grams of a light orange viscous oil was obtained, which represents a yield of 97.3 percent even though the high viscosity of the material precluded pouring all of the product from the flask. The product had a viscosity of 4630 poise at 25° C. and contained less than 0.03 percent residual maleic anhydride by titration with dilute sodium hydroxide solution.

Example 3

Preparation of a Range of Polybutadiene-Maleic Anhydride Adduct Homopolymers and Styrene Butadiene Copolymer Maleic Anhydride Adducts for use in Adhesion Studies with Various Elastomers The resins shown below in Table I were prepared in similar fashion and characterized in the similar way as described in Examples 1 and 2. All of these maleic anhydride adducts were amber to red-brown viscous liquids except Ricon 154/MA, which was a glassy solid at 25° C., and Ricon 140/MA which was a crystalline material with rather low melting point with a broad melting range (about 20°-60° C.). NMR, IR, FTIR and Gel Permeation Chromatography have been used to characterize these resins, some of which are now well-known, commercially-available resins.

TABLE I

| Starting Resin(1) | Resin Type | Molecular Weight | Vinyl Content | Name of Maleic Anhydride Adduct | Content, % |
|---|---|---|---|---|---|
| Ricon 130 | Homopolymer | 2500 | 20 | Ricon 130/MA | 8 |
| Ricon 131 | Homopolymer | 5000 | 23 | Ricon 131/MA | 10 |
| Ricon 134(2) | Homopolymer | 9000 | 20 | Ricon 134/MA | 10 |
| Ricon 140(2) | Homopolymer | 1500 | 45 | Ricon 140/MA | 25 |
| Ricon 154 | Homopolymer | 3200 | 83 | Ricon 154/MA | 10 |
| Ricon 154 | Homopolymer | 3200 | 83 | Ricon 154/MA | 25 |
| Ricon 181 | Copolymer | 2000 | 20 | Ricon 181/MA | 10 |
| Ricon 184 | Copolymer | 3200 | 18 | Ricon 184/MA | 10 |
| Ricon 150 | Homopolymer | 2200 | 70 | Ricon 150/MA | 10 |

(1) See Colorado Chemical Specialties, Inc., Product Bulletin CCS-100 dated August 20, 1985 for additional information on structure.
(2) Ricon 134 and 140 are not listed in (1). Ricon 134 is a higher molecular weight version of Ricon 131, and Ricon 140 is a lower molecular weight version of Ricon 142, both of which are listed in (1).

Example 4

Preparation of Cured Natural Rubber Containing a Maleic Anhydride Adduct of Polybutadiene A large batch of natural rubber having the composition shown in Table II was made on a two roll rubber mill, using techniques standard to the rubber industry. Peptizer Ricon P-30/D is a partly saturated liquid polybutadiene dispersed on high surface area silica.

TABLE II

| "Natural Rubber" Master Batch, Carbon Filled | | | |
|---|---|---|---|
| NR RSS-1 | 100.0 | 100.0 | 100.0 |
| HAF N-330 Carbon Black | 35.0 | 35.0 | 35.0 |
| Stearic Acid | 2.0 | 2.0 | 2.0 |
| Zinc Oxide | 5.0 | 5.0 | 5.0 |
| Peptizer Ricon P-30/D | 1.0 | 1.0 | 1.0 |
| Sulfur | 2.25 | 2.25 | 2.25 |
| TBBS | 0.7 | 3.0 | 3.0 |
| Ricon 131/MA9 | — | — | 10.0 |
| | 145.95 | 148.25 | 158.25 |

292 grams of this master batch was blended with 20 grams of the maleinized polybutadiene containing 9% by weight of maleic anhydride but otherwise similar to the resin described as Ricon 131/MA of Example 2. These materials were mixed until a well-blended rubber compound was achieved. Approximately 10 grams of each of these mixtures was then placed between the dies of a Monsanto Rheometer and cured under conditions described in Table III. These cures were compared with a master batch of the same composition unmodified with maleinized polybutadiene resin. The details of this comparison are given in Table III below:

TABLE III

| FORMULATION: | STD | MODIFIED |
|---|---|---|
| FORMULATION: NATURAL RUBBER RHEOMETER DATA @ 150 C. | | |
| INITIAL VISCOSITY: (inch lbs) | 6.0 | 4.9 |
| MINIMUM VISCOSITY: (inch lbs) | 2.9 | 3.0 |
| SCORCH TIME (Ts1): (Min) | 3.1 | 5.1 |
| CURE TO 90% (T90): (Min) | 11.0 | 7.5 |
| MAXIMUM TORQUE: (inch lbs) | 30.9 | 51.8 |
| CURE RATE INDEX: | 12.7 | 41.3 |
| PHYSICAL PROPERTIES CURED FOR 25 MINUTES @ 150° C. | | |
| TENSILE STRENGTH: (PSI) | 2864 | 1253 |
| ELONGATION: (percent) | 495 | 275 |
| MODULUS @ 100%: (PSI) | 274 | 885 |
| DIE C TEAR: (PPI) | 283 | 175 |
| REBOUND RESILIENCE | 40 | 32 |
| SHORE A HARDNESS: | 65 | 79 |
| LAP SHEAR | | |

TABLE III-continued

| FORMULATION: | STD | MODIFIED |
|---|---|---|
| ON ALUMINUM(1): (PPI) | 42 | 407 |
| ON STEEL(1) | 106 | 392 |
| ON STAINLESS(2) | 82 | 250 |

(1) SURFACE SANDED AND WIPED WITH METHANOL
(2) NO SURFACE CLEANING

From this data it can be seen that the rather large amount of added maleinized polybutadiene and the additional curative brought about very significant modification of the compound in numerous respects: First, it is clear that the unvulcanized material is plasticized to a considerable extent such that the initial viscosity is decreased from 6.0 inch lbs to 4.9 inch lbs. Second, the scorch time (Ts1) was improved from 3.1 minutes to 5.1 minutes. Third, once initiated, however, the cure rate index (12.7 versus 41.7) shows that the rate of cure was quite fast for the maleic anhydride adduct modified elastomer compound (90% cure at 7.5 minutes versus 11.0 minutes), and indeed the ultimate cure was greater for the modified natural rubber by a very considerable factor (Maximum torque 51.8 in lbs versus 30.9 in lbs). The very significant observation should be made, that the dies of the Monsanto Rheometer were now tenaciously cemented together and required extreme means and much time to bring about separation and clean up the dies. Simple long-term heating of the dies did not bring about much, if any, decrease in adhesion and this, and other evidence to be presented in this experimental section show that the adhesion was not simply the result of undercure of the elastomer system.

The physical properties of the maleinized polybutadiene modified natural rubber compound were affected by the change also. Six-by-six inch sheets were cured at 150° C. in a highly-polished mold on which it was necessary to apply release agents, but otherwise were molded by standard sample preparation methods. The sheets were cut into standard tensile specimens and Die C specimens and tested by the usual ASTM methods. These results are also given in Table III. The differences in physical properties are the following: First, the tensile strength was decreased from 2864 psi to 1253 psi for the modified compound, and the ultimate elongation was reduced from 495% to 275% indicating that there was a considerable increase in crosslinking for this natural rubber compound, and the change in 100% modulus from 274 to 885 PSI confirms this as does the rather dramatic change in hardness from 65 Shore A durometer to 79. For such a dramatic increase in crosslinking, however, the dynamic properties of the rubber, such as rebound resilience remained satisfactory in large degree. The lap shear strengths on aluminum, steel and stainless steel are dramatically increased for the formulation containing maleinized polybutadienes. Lap sheer specimens made with the identical compounds with added accelerators, without the Ricon 131/MA9 adduct, had such low adhesion that the lap shear strength could only be estimated to be about 10 PPI. To bring back the physical properties of such a compound described above requires small changes in the cure system as demonstrated in Example 5.

Example 5

Preparation of a Natural Rubber SMR-L Composition which is very Adhesive to Metal Substrates and also has Excellent Physical Properties The procedures of Example 4 were followed except that Natural Rubber SMR-L was used instead of RSS-1, and rheometer data Was taken at 135° C. instead of 150° C. Physical properties are shown in Table IV.

TABLE IV

| FORMULATION: | STD | MODIFIED No TBBS | MODIFIED 1PHR TBBS |
|---|---|---|---|
| FORMULATION: NATURAL RUBBER SMR-L RHEOMETER DATA @ 135° C. | | | |
| INITIAL VISCOSITY: (inch lbs) | 13.0 | 11.0 | 11.0 |
| MINIMUM VISCOSITY: (inch lbs) | 10.2 | 9.2 | 8.4 |
| SCORCH TIME (Ts1): (Min) | 6.0 | 11.0 | 13.9 |
| CURE TO 90% (T90): (Min) | 17.1 | 56.6 | 28.0 |
| MAXIMUM TORQUE: (inch lbs) | 35.8 | 22.5 | 36.5 |
| CURE RATE INDEX: | 9.0 | .2 | 7.1 |
| PHYSICAL PROPERTIES CURE TIME: 45 MINUTES @ 135° C. | | | |
| TENSILE STRENGTH: (PSI) | 4794 | 1024 | 3968 |
| ELONGATION: (percent) | 625 | 550 | 650 |
| MODULUS @ 100%: (PSI) | 314 | 133 | 363 |
| DIE C TEAR: (PPI) | 504 | 127 | 391 |
| REBOUND RESILIENCE | 41 | 39 | 38 |
| SHORE A HARDNESS: | 65 | 58 | 68 |
| LAP SHEAR | | | |
| ON ALUMINUM(1): (PPI) | 48 | 313 | 336 |
| ON STEEL(1) | 0 | 105 | 403 |
| ON STAINLESS(2) | 42.5 | 147.5 | 157.5 |

(1) SURFACE SANDED AND WIPED WITH METHANOL
(2) NO SURFACE CLEANING

A careful study of the Rheometer data and the physical properties of the cured compound show that the maleic modified polybutadiene plasticizes the natural rubber compound, and causes undesirable changes in the cure unless changes in the vulcanization package are also made. The data shows that the physical properties and cure properties may be returned to useful levels by modification of the accelerator composition, in this case by adding 1 Phr TBBS. The change in the cure rate accelerator package of adding TBBS does not cause the adhesion of this Natural Rubber compound to return to the previous poor levels. In general, reformulation of the accelerator composition such as by the addition of TBBS or increase in the vulcanization agent will be required to bring about a rubber compound with satisfactory physical and curing properties, including increased adhesion by the methods of this patent.

Example 6

Preparation of an Ethylene Propylene Dimer (EPDM) Compound Modified with a Maleic Adducted Polybutadiene Resin The following EPDM compound was prepared on a roll mill in the usual way. A portion of the batch was modified by adding 10 percent of the weight of EPDM rubber, maleic adducted polybutadiene resin (Ricon 131/MA containing 9% by weight maleic anhydride) as described in Example 2, plus a quantity of TBBS to return most of the physical properties to near the original values. The details of this blend are shown in Table V.

TABLE V

| "EPDM" Master Batch, Carbon Filled. | | |
|---|---|---|
| EPDM 70A | 100.0 | 100.0 |
| HAF N-330 Carbon Black | 80.0 | 80.0 |
| Stearic Acid | 1.0 | 1.0 |
| Rubber Process Oil | 50.0 | 50.0 |
| Zinc Oxide | 5.0 | 5.0 |
| TMTD | 1.0 | 1.0 |
| MBT | 0.5 | — |
| Sulfur | 1.5 | 1.5 |
| TBBS | — | 3.0 |
| Ricon 131/MA9 | — | 10.0 |
| | 239.0 | 253.0 |

This EPDM compound and the maleic anhydride polybutadiene modified EPDM compound were compared while being cured in a Monsanto Rheometer with results that were quite similar to the natural rubber compound. The EPDM compound could be removed quite nicely from the Rheometer dies, but the EPDM which had been compounded with the maleic adduct of polybutadiene resin was cured into a tough mass which substantially bonded the dies together, and it was with great difficulty that the dies could be parted. It was necessary to swell the elastomer in solvent overnight before the dies could be cleaned and then only with difficulty.

Both the unmodified and modified EPDM formulations were vulcanized at 160° C. in a 6" by 6" sheet mold, and the molded material was tested as shown in Table VI. It was necessary to use mold release in order to achieve release of the modified EPDM formulation from the highly chromed steel mold, however, with a silicone mold release, this proved not to be a problem. The physicals determined for the various specimens cut from the sheet molded compounds showed that in this case, the material appeared to be plasticized somewhat by the added maleinized polybutadiene rather than being too highly crosslinked as was shown to be the case with the natural rubber formulation. This was evident from the small change in the tensile strength, the large change in the ultimate elongation and modulus at 100%, and the improvement observed in the Die C tear strength. There was also very little change in the Shore A hardness, which was not entirely expected. The data shows a very significant improvement in the lap shear strength of the modified EPDM compound which was nearly lacking in the unmodified EPDM compound. This very good improvement is adhesion to metal is not typical for EPDM, which is considered to be an elastomer not easily adhered to many substrates including most metals.

TABLE VI

| FORMULATION: | STANDARD | 131MA MODIFIED |
|---|---|---|
| FORMULATION: EPDM RUBBER RHEOMETER DATA @ 160 C. | | |
| INITIAL VISCOSITY: (inch lbs) | 9.2 | 9.65 |
| MINIMUM VISCOSITY: (inch lbs) | 6.2 | 7.2 |
| SCORCH TIME (Ts1): (Min) | 3.4 | 5.6 |
| CURE TO 90% (T90): (Min) | 21.8 | 14.2 |
| MAXIMUM TORQUE: (inch lbs) | 47.2 | 37.5 |
| CURE RATE INDEX: | 5.4 | 11.6 |
| PHYSICAL PROPERTIES CURE TIME: 45 MINUTES 150° C. | | |
| TENSILE STRENGTH: (PSI) | 2331 | 2231 |
| ELONGATION: (percent) | 375 | 515 |
| MODULUS @ 100%: (PSI) | 983 | 364 |
| DIE C TEAR: (PPI) | 285 | 330 |
| REBOUND RESILIENCE: | 36 | 31 |
| SHORE A HARDNESS: | 72 | 73 |
| LAP SHEAR: ON ALUMINUM(1) | 0 | 616 |
| LAP SHEAR: ON STEEL(1) | 35 | 642 |
| LAP SHEAR ON STAINLESS(2) | 22 | 405 |

(1) SURFACE SANDED AND WIPED WITH METHANOL
(2) SURFACE WAS NOT CLEANED

Example 7

Preparation of an Acrylonitrile Butadiene Rubber (NBR) Compound Modified with Maleic Anhydride Adducted Polybutadiene for Proposes of Studying the Adhesive Bonds of these Formulations to Various Substrates The compound shown below in Table VII as unmodified nitrile was used as a master batch to study the modification of nitrile rubber with maleic adducted polybutadiene. The compounds, including the adduct were mixed on a roll mill under the usual laboratory conditions for the compounding of such materials.

TABLE VII

| Nitrile Master Batch, Carbon Filled. | | | |
|---|---|---|---|
| | Unmod | 22-159 Mod. | 32-02 Mod. |
| NBR 35% ACN | 100.0 | 100.0 | 100.0 |
| N-787 SRF Carbon Black | 75.0 | 75.0 | 75.0 |
| Stearic Acid | 1.0 | 1.0 | 1.0 |
| Zinc Oxide | 5.0 | 5.0 | 5.0 |
| Ricon 131/MA9% | — | 10.0 | 10.0 |
| MBTS | 1.5 | 1.5 | — |
| TBBS | — | 3.0 | — |
| TMTD | — | — | 3.0 |
| Sulfur | 1.5 | 1.5 | 1.5 |
| | 184.0 | 197.0 | 198.5 |

In addition to the comparative examples shown in examples 3 and 4, changes in the composition of this nitrile compound were made in an attempt to bring the physical properties back to near the normal values without losing the property of adhesion to metal. These changes in the formulations resulted in the following data shown in Table VIII.

TABLE VIII

FORMULATION: NBR RUBBER RHEOMETER DATA

| FORMULATION | Cured at 150° C. | | | Cured at 135° C. |
|---|---|---|---|---|
| | A. STD. | 22-159 | 32-02 | 32-02 |
| INITIAL VISC: (inch lbs) | 23.2 | 13.9 | 10.2 | 18.0 |
| MINIMUM VISC: (inch lbs) | 15.7 | 9.0 | 7.5 | 11.0 |
| SCORCH TIME: (Ts1) min | 3.4 | 2.1 | 2.0 | 5.4 |
| CURE TIME: (T90) min | 10.8 | 26.6 | 8.4 | 16.2 |
| MAX TORQUE: (inch lbs) | 41.3 | 59.0 | 79.0 | 79.7 |
| CURE RATE INDEX: | 13.5 | 4.1 | 15.6 | 9.3 |

PHYSICAL PROPERTIES

| | 45 MINUTES @ 150° C. | | | 45 MIN @ 135° C. |
|---|---|---|---|---|
| CURE TIME: | STD | 22-159 | 32-02 | 32-02 |
| TENSILE: (PSI) | 3004 | 1644 | 1485 | 3272 |
| ELONGATION: (percent) | 290 | 205 | 120 | 230 |
| MODULUS: @ 100%(PSI) | 1211 | 600 | 1131 | 2246 |
| DIE C TEAR: (PPI) | 423 | 174 | 118.5 | 252.5 |
| REBOUND: RESILIENCE: | 12 | 11 | 11 | 12 |
| HARDNESS: SHORE A | 83 | 84 | 87 | 87 |
| LAP SHEAR ON ALUMINUM(1) | 0 | 350 | 90 | 95 |
| LAP SHEAR ON STEEL(1) | 0 | 432 | 430 | 460 |
| LAP SHEAR ON STAINLESS(1) | 0 | 255 | 27.5 | 45 |

(1)SURFACE SANDED AND WIPED WITH METHANOL

The lap shear values shown in the above examples demonstrate the improvements that modification of the original NBR compound with maleinized polybutadiene resin can bring about. These compounds require additional sulfur or soluble sulfur accelerators in the cure package to keep physical properties in the proper range. The above examples demonstrate that modification of the cure package, in this case by addition of 3 phr of either TMTD or TBBS can overcome changes brought about by plasticization and the introduction of more unsaturation to the rubber compound from the maleinized polybutadiene. Further work has shown that 3 phr of either TMTD or TBBS is generally too high and that both better physicals and better adhesion is obtainable by optimization of these factors for all components of the cure package along with the quantity of maleinized polybutadiene added to the system. In most cases the physicals are respectable using 0.9 phr increase in TMTD, TBBS or sulfur. The quantity should be experimentally determined when it is necessary to maximize adhesion. We have demonstrated that the modification of the cure package without also adding the maleinized polybutadiene does not contribute to increased adhesion, but instead usually brings about reduction in this property. Lower cure temperature sufficient to bring about the desired state of cure improves the adhesive bond in several cases so far studied and is demonstrated by the data in Table IX.

Example 8

Formulation of cis-polybutadiene rubber with maleic adducted polybutadiene and the effect on adhesion The following compound was used to test the effects of milling in 10% by weight polybutadiene which had been adducted with maleic anhydride. To 167.4 parts of the cis-polybutadiene rubber master batch made on a two-roll mill was added 3.0 parts TBBS and 10.0 parts of Ricon 131/MA, and this blend which represents 10% by weight of the BR content was then milled until the compound was judged to be well mixed.

TABLE IX

"Cis-Polybutadiene Rubber" Master Batch Carbon Filled

| | | |
|---|---|---|
| BR | 100.0 | 100.0 |
| HAF N-330 Carbon Black | 60.0 | 60.0 |
| Stearic Acid | 2.0 | 2.0 |
| Zinc Oxide | 3.0 | 3.0 |
| Sulfur | 1.5 | 1.5 |
| MBS | 0.9 | 0.9 |
| TBBS | — | 3.0 |
| Ricon 131/MA9 | — | 10.0 |
| | 167.4 | 180.4 |

About 10 grams of the first of the compounds shown in Table IX were placed between the dies of a Monsanto Oscillating Disk Rheometer having dies preheated to 160° C. and the compound was cured in a manner typical of rubber compounds. The standard BR compound cured normally with the results shown in Table X. This process was repeated for the modified BR compound and the data is also shown in Table X. The additional TBBS accelerator brought about a more rapid cure as seen by the greater cure rate index and by the shorter cure time. The Ph was approximately the same as the unmodified compound. This faster cure resulted in greater crosslinking which was manifested in the lower tensile, lower elongation to break, reduced tear strength and higher hardness. Whereas these other properties suggest that the compound would benefit from reduced accelerator and perhaps a lower cure temperature, the adhesive bond between the modified elastomer, which would also be expected to suffer from this type of cure was actually quite good as shown by the lap shear tests on aluminum, steel, and stainless steel. The quality and strength of this bond would be quite unexpected by the astute rubber chemist. A small sample was cured containing the standard cis-polybutadiene compound with increased TBBS, but without the maleic adduct of polybutadiene to test the lap shear strength on aluminum, and steel, but the strength of these bonds was too low to measure. This result confirms the unusual nature of the adhesive bond. A rubber slab was also cured at 135° C. and the results show considerable improvement in tensile strength and other cured properties of the BR compound.

TABLE X

FORMULATION: CIS POLYBUTADIENE

| | RHEOMETER DATA | | |
|---|---|---|---|
| | @ 160° C. | | @ 135° C. |
| | STANDARD | 131 MA MOD | 131 MA MOD |
| INITIAL VISCOSITY: (inch lbs) | 26.9 | 11.7 | 17.8 |
| MINIMUM VISCOSITY: (inch lbs) | 21.6 | 15.1 | 15.6 |
| SCORCH TIME (Ts1): | 4.9 | 3.9 | 6.4 |

TABLE X-continued

| | | | |
|---|---|---|---|
| (Min) | | | |
| CURE TO 90% (T90): | 14.0 | 10.9 | 25.9 |
| (Min) | | | |
| MAXIMUM TORQUE Mh: | 66.3 | 68.6 | 70.0 |
| (inch lbs) | | | |
| CURE RATE INDEX | 11.0 | 14.4 | 5.1 |

| PHYSICAL PROPERTIES | | | |
|---|---|---|---|
| | CURE TIME: | | |
| | 45 MINUTES @ 150° C. | | 45 @ 135° C. |
| TENSILE STRENGTH: (PSI) | 2202 | 790 | 2174 |
| ELONGATION: (Percent) | 225 | 150 | 100 |
| MODULUS @ 100%: (PSI) | 676 | 371 | 1218 |
| DIE C TEAR: (PPI) | 363 | 157 | 302 |
| REBOUND RESILIENCE: | 52 | 48 | 55 |
| SHORE A HARDNESS: | 79 | 80 | 86 |
| LAP SHEAR: ON ALUMINUM(1) | 120 | 617 | 402 |
| LAP SHEAR: ON STEEL(1) | 143 | 363 | 387 |
| LAP SHEAR ON STAINLESS(2) | 121 | 328 | 244 |

(1)SURFACE SANDED AND WIPED WITH METHANOL
(2)SURFACE NOT CLEANED

Example 9

Formulation of polychloroprene rubber formula with adducted polybutadiene resin for improved adhesion A polychloroprene formulation was mixed using a two roll mill. ETU and Ricaccel were tested in this compound as cure rate accelerators, and were then selectively replaced or partly replaced with Ricon 131/MA10. Ricaccel is a polychloroprene accelerator that does not contain ETU, and is made by Colorado Chemical Specialties, Grand Junction, Col. The cure rate of the compounds containing 10 phr Ricon 131/MA10 were reduced, and the compounds were not as hard, indicating significant plasticizing effect. However, the compound containing no accelerator cured adequately, and exhibited good adhesion properties. The lap shear strength tests of the compounds give results that are not entirely simple. For example, it is known that ETU-cured polychloroprene has reasonable adhesiveness to steel and aluminum, and this fact is shown by the test data. The lap shear test on stainless steel was improved for the compounds containing the maleinized resins. Formulations of this type must be maximized for the particular adhesion effect desired, but in general give enhanced adhesion to substrates when properly maximized.

TABLE XI

| Polychloroprene Rubber Formula Carbon Filled | | | | |
|---|---|---|---|---|
| | STD | A.1 | A.2 | A.3 |
| Neoprene W Type | 100.0 | 100.0 | 100.0 | 100.0 |
| Maglite D (MgO) | 4.0 | 4.0 | 4.0 | 4.0 |
| Stearic Acid | 1.0 | 1.0 | 1.0 | 1.0 |
| N-330 Carbon | 60.0 | 60.0 | 60.0 | 60.0 |
| Octamine | 1.5 | 1.5 | 1.5 | 1.5 |
| Wingstay 100 | 1.5 | 1.5 | 1.5 | 1.5 |
| Zinc Oxide (85%) | 5.0 | 5.0 | 5.0 | 5.0 |
| ETU (END-75) | 2.0 | -.- | -.- | -.- |
| RICACCEL | -.- | 2.0 | -.- | 1.0 |
| TBBS | -.- | -.- | 1.0 | 1.0 |
| RICON 131MA10 | -.- | -.- | 10.0 | 10.0 |

TABLE XI-continued

| Polychloroprene Rubber Formula Carbon Filled | | | |
|---|---|---|---|
| STD | A.1 | A.2 | A.3 |
| 174.0 | 174.0 | 183.0 | 184.0 |

TABLE XII

FORMULATION: CR RUBBER CARBON FILLED
RHEOMETER DATA @ 160° C.

| | STD | A.1 | A.2 | A.3 |
|---|---|---|---|---|
| INITIAL VISCOSITY: (inch lbs) | 29.0 | 27.5 | 23.0 | 23.0 |
| MINIMUM VISCOSITY: (inch lbs) | 23.0 | 22.5 | 20.0 | 21.0 |
| SCORCH TIME (Ts1): (Min) | 1.0 | 0.5 | 0.9 | 0.9 |
| CURE TO 90% (T90): (Min) | 9.8 | 5.2 | 20.4 | 11.5 |
| MAXIMUM TORQUE: (inch lbs) | 86.0 | 85.0 | 61.0 | 66.0 |
| CURE RATE INDEX: | 11.4 | 21.3 | 5.1 | 9.4 |

PHYSICAL PROPERTIES
CURE TIME: 45 MINUTES @ 150° C.

| | FORMULATION: | | | |
|---|---|---|---|---|
| | STD | A.1 | A.2 | A.3 |
| TENSILE STRENGTH: (PSI) | 2932 | 3101 | 2396 | 2148 |
| ELONGATION: (percent) | 150 | 150 | 165 | 140 |
| MODULUS @ 100%: (PSI) | 2345 | 2284 | 1204 | 1606 |
| DIE C TEAR: (PPI) | 342 | 368 | 286 | 261 |
| REBOUND RESILIENCE: | 25 | 23 | 28 | 28 |
| SHORE A HARDNESS: | 90 | 90 | 84 | 86 |
| LAP SHEAR: ON ALUMINUM(1) | 88 | 193 | 123 | 425 |
| LAP SHEAR: ON STEEL(1) | 160 | 232 | 98 | 125 |
| LAP SHEAR: ON STAINLESS(2) | NO BOND | 124 | 275 | 168 |

(1)SURFACE SANDED AND WIPED WITH METHANOL
(2)NO SURFACE TREATMENT

Example 10

Formulation of styrene butadiene rubber master batch with maleic adducted polybutadiene resin to improve adhesion The compounds shown in Table XIII were mixed on a two-roll rubber mill with normal attention to the conditions of mixing for test specimens. The maleic adducted polybutadiene modified SBR compound contained increased content of TBBS and a quantity of maleic adducted polybutadiene calculated to bring the content of this material in the compound to ten percent of the SBR content. This quantity is somewhat arbitrary and does not represent the amount of maleic adducted polybutadiene needed to obtain maximized results with respect to either physical properties or adhesive bond. However, this quantity is sufficient to show that the adhesive bond strength to various substrates is improved considerably when compared to the unmodified SBR compound.

TABLE XIII

"Styrene-Butadiene Rubber" Master
Batch Carbon Filled

| | | |
|---|---|---|
| SBR | 100.0 | 100.0 |
| HAF N-330 Carbon Black | 50.0 | 50.0 |
| Stearic Acid | 1.0 | 1.0 |

TABLE XIII-continued

"Styrene-Butadiene Rubber" Master Batch Carbon Filled

| | | |
|---|---|---|
| Zinc Oxide | 3.0 | 3.0 |
| MBS | 0.7 | 0.7 |
| Sulfur | 1.75 | 1.75 |
| TBBS | 0.9 | 3.0 |
| Ricon 131/MA9 | — | 10.0 |
| | 157.35 | 169.45 |

The results of testing of these compounds are shown in Table XIV. The Rheometry data shows that the Ricon 131/M modified SBR is plasticized. This is evident from the lower values of the initial viscosity and the minimum viscosity. The somewhat slower curing modified material does however attain a very satisfactory ultimate cure value. The data shown in Table XIV does illustrate another general property of Sulfur vulcanized rubber containing maleinized polybutadiene resins for the purpose of enhancement of adhesion. The use of cure temperatures should be carefully evaluated. In many cases, a lower cure temperature is indicated as can be seen in the comparison of the SBR compound at cure temperatures of 150° C. and 135° C. The observation was made that the higher temperature cure caused the formation of tiny bubbles in this particular formulation. In part, this effect seems to be a consequence of using TBBS, and the problem can usually be alleviated by the use of alternate accelerators in the formulation of the adhesive rubber compound.

TABLE XIV

FORMULATION: STYRENE BUTADIENE RUBBER RHEOMETER DATA @ 160° C.

| | STANDARD | 131MA MODIFIED |
|---|---|---|
| INITIAL VISCOSITY: (inch lbs) | 12.5 | 9.9 |
| MINIMUM VISCOSITY: (inch lbs) | 8.2 | 7.0 |
| SCORCH TIME (Tsl): (Min) | 5.5 | 3.8 |
| CURE TO 90% (T90): (Min) | 20.0 | 13.3 |
| MAXIMUM TORQUE: (inch lbs) | 62.5 | 67.8 |
| CURE RATE INDEX: | 6.9 | 10.5 |

PHYSICAL PROPERTIES

| | CURE TIME: | |
|---|---|---|
| | 45 MINUTES @ 150° C. | 45 @ 135° C. |
| TENSILE STRENGTH: (PSI) | 2931 | 826 | 2135 |
| ELONGATION: (percent) | 200 | 125 | 145 |
| MODULUS @ 100%: (PSI) | 931 | 682 | 1294 |
| DIE C TEAR: (PPI) | 302 | 145 | 254 |
| REBOUND RESILIENCE: | 32 | 31 | 39 |
| SHORE A HARDNESS: | 80 | 82 | 82 |
| LAP SHEAR: ON ALUMINUM(1) | 23 | 283 | 295 |
| LAP SHEAR ON STEEL(1) | 0 | 440 | 505 |
| LAP SHEAR ON STAINLESS(1) | 23 | 250 | 440 |

(1)SURFACE SANDED AND WIPED WITH METHANOL

Example 11

Comparison of peroxide cured EPDM containing maleic adduct of polybutadiene of low vinyl moderate maleic anhydride content with adduct of high vinyl high maleic anhydride content

TABLE XV

"EPDM" Master Batch, Carbon Filled. Peroxide cured

| | | | |
|---|---|---|---|
| EPDM 70A | 100.0 | 100.0 | 100.0 |
| N-762 Carbon Black | 75.0 | 75.0 | 75.0 |
| Agerite Resin D | 1.0 | 1.0 | 1.0 |
| Methyl Niclate | 1.0 | 1.0 | 1.0 |
| Dicup 40KE | 6.0 | 6.0 | 6.0 |
| Ricon 131/MA9 | — | 10.0 | — |
| Ricon 156/MA17 | — | — | 10.0 |
| | 183.0 | 193.0 | 193.0 |

TABLE XVI

FORMULATION: EPDM RUBBER, Peroxide cured RHEOMETER DATA @ 160° C.

| | FORMULATION: | | |
|---|---|---|---|
| | STANDARD | 131/MA9 | 156/MA17 |
| INITIAL VISCOSITY: (inch lbs) | 25.5 | 18.0 | 18.6 |
| MINIMUM VISCOSITY: (inch lbs) | 19.0 | 12.8 | 12.5 |
| SCORCH TIME (Tsl): (Min) | 1.1 | 1.05 | 1.1 |
| CURE TO 90% (T90): (Min) | 13.4 | 13.4 | 12.6 |
| MAXIMUM TORQUE: (inch lbs) | 77.0 | 65.0 | 65.0 |
| CURE RATE INDEX: | 8.1 | 8.1 | 8.7 |

PHYSICAL PROPERTIES
CURE TIME: 45 MINUTES 150° C.

| | FORMULATION: | | |
|---|---|---|---|
| | STANDARD | 131/MA9 | 156/MA17 |
| TENSILE STRENGTH: (PSI) | 2939 | 1800 | 2036 |
| ELONGATION: (percent) | 215 | 275 | 275 |
| MODULUS @ 100%: (PSI) | 923 | 513 | 575 |
| DIE C TEAR: (PPI) | 273 | 277 | 274 |
| REBOUND RESILIENCE: | 50 | 48 | 44 |
| SHORE A HARDNESS: | 80 | 75 | 77 |
| LAP SHEAR: ON ALUMINUM(1) | 180 | 1187 | 1875 |
| LAP SHEAR: ON STEEL(1) | 125 | 733 | 1990 |
| LAP SHEAR ON STAINLESS(2) | 7 | 282 | 1435 |

(1)SURFACE SANDED AND WIPED WITH METHANOL
(2)SURFACE NOT TREATED

Comparison of the adhesive data on EPDM compounds described in Example 5 using accelerated sulfur vulcanization with the data from the peroxide cured EPDM compound described in this Example shows that the peroxide system is a comparatively very satisfactory adhesive for rubber to metal bonds. Evidence so far indicates that peroxide systems are in general superior when maleic adducts of polybutadiene resins are used in adhesive enhancement. However, as previous Examples have indicated quite adequate results may be obtained with either type of cure. The data in Table XIV also indicates that the high vinyl type of polybutadiene resin provides the best adhesive compound for peroxide cures. This is not unexpected since in general, the high vinyl polybutadienes are superior to low vinyl polybutadienes as crosslinking and coupling agents for peroxide cured elastomers. The very high values of lap shear strength shown in Table XV should be carefully noted, since EPDM is considered a very poor elastomer for use in applications requiring adhesion to metals or plastics. Not only does this data place this generalization into question, but also demonstrates very clearly the value of our invention.

We claim:

1. An uncured, curable elastomeric composition comprising:
   (a) an uncured unsaturated polymeric adduct, formed by C—C bonds in the presence of a free radical polymerization inhibitor, by reacting a polymer having unsaturation in the backbone of the polymer chain with an unsaturated dicarboxylic acid or dicarboxylic acid derivative wherein the acid or derivative moiety comprises at least about three weight percent of said adduct;
   (b) an uncured elastomer different from the adduct of paragraph (a) consisting essentially of synthetic elastomer;
   wherein said adduct of paragraph (a) is present in an amount sufficient such that said composition upon curing exhibits increased adhesive properties compared to a standard upon curing, which standard consists of said elastomer of paragraph (b) without the adduct of paragraph (a), based on the ASTM D 816-70 lap shear test on steel.

2. The composition of claim 1 wherein the dicarboxylic said or derivative moiety of sad adduct is selected from the group consisting of an alpha, beta-ethylenically unsaturated dicarboxylic acid and derivatives of such an alpha, beta-ethylenically unsaturated dicarboxylic acid which is represented by the following general formula:

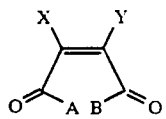

in which X and Y are hydrogen atoms or alkyl groups, and may be the same or different; and A and B are hydroxyl groups, alkoxyl groups, alkyl substituted amine groups or taken together are an —O— bond or an —N(R)— n bond, where R is alkyl or hydrogen.

3. The composition of claim 1 in which the polymer of said adduct having unsaturation in the backbone of the polymer chain is obtained from at least one monomer which is a conjugated diene containing from four to twelve carbon atoms.

4. The composition of claim 3 in which the polymer having unsaturation in the backbone of the polymer chain is a copolymer obtained from a mixture of a conjugated diene containing from four to twelve carbon atoms and at least one monomer which is a vinyl substituted aromatic compound containing from eight to twelve carbon atoms.

5. The composition of claim 3 in which said a polymer having unsaturation in the backbone of the polymer chain is polybutadiene.

6. The composition of claim 5 in which the polybutadiene polymer is a mixture of 1,2 and 1,4 modes of addition and contains cis and trans unsaturation in the backbone of the polymer chain and vinyl unsaturation pendant to the polymer chain.

7. The composition of claim 3 in which the polymer having unsaturation in the backbone of the polymer chain is polyisoprene.

8. The composition of claim 3 in which the polymer having unsaturation in the backbone of the polymer chain is a substituted polybutadiene.

9. The composition of claim 4 in which the polymer having unsaturation in the backbone of the polymer chain is styrene butadiene copolymer.

10. The composition of claim 4 in which the polymer having unsaturation in the backbone of the polymer chain is styrene isoprene copolymer.

11. The composition of claim 1 in which the elastomer is selected from the group consisting of polyisoprene rubber, polybutadiene rubber, styrene polybutadiene rubber, butyl rubber, acrylonitrile butadiene rubber, polychloroprene rubber, chlorobutyl rubber, bromobutyl rubber, hydrogenated acrylonitrile butadiene rubber, chlorosulfonated polyethylene and mixtures thereof.

12. The composition of claim 1 in which the dicarboxylic acid or derivative moiety of said adduct is maleic anhydride.

13. The composition of claim 1 in the shape of a film.

14. An uncured, curable elastomeric composition which exhibits adhesive properties upon curing comprising:
   a) an unsaturated polymeric adduct of a dicarboxylic acid or dicarboxylic acid derivative formed by C—C bonds in the presence of a free radical polymerization inhibitor, wherein the acid or derivative moiety comprises at least about three weight percent of said adduct; and wherein
   b) the unsaturated polymeric moiety of said adduct is a polymer unsaturation in the backbone of the polymer chain and a cis-1,4 content of less than about 70%; and
   c) an uncured elastomer different from the adduct of paragraph (a) comprising natural rubber (NR).

15. The composition of claim 14 wherein the unsaturated polymeric moiety of said adduct has a molecular weight between about 400 and about 8,000.

16. A method for making a curable elastomeric composition comprising:
   (a) reacting a polymer having unsaturation in the backbone of the polymer chain with an unsaturated dicarboxylic acid or derivative to form an unsaturated polymeric dicarboxylic acid adduct, said adduct being formed by C—C bonds in the presence of a free radical polymerization inhibitor, wherein said dicarboxylic acid or derivative moiety comprises at least about 3 weight percent of said adduct;
   (b) adding said adduct to uncured synthetic elastomer different from the adduct of paragraph (a) in an amount of between about 2 and about 50 weight percent of said uncured adhesive elastomeric composition, said amount being sufficient such that said composition upon curing exhibits increased adhesive properties compared to a standard upon curing, which standard is said synthetic elastomer not containing said adduct based on ASTM D 816-70 lap shear tests on steel.

17. A method for making a curable elastomeric composition comprising natural rubber, which exhibits adhesive properties upon curing comprising:

a) reacting a polymer having unsaturation in the backbone of the polymer chain, having a cis-1,4 composition less than about 70% with a dicarboxylic acid or derivative in the presence of a free radical polymerization inhibitor to form an adduct with said unsaturated polymeric dicarboxylic acid or derivative wherein said acid or derivative moiety comprises at least about 3 weight percent of said adduct; and (b) adding said adduct to an uncured elastomer different from the adduct of paragraph (a) comprising natural rubber in an amount of between about 2 and about 50 weight percent of said uncured elastomeric composition.

* * * * *

UNITED STATES PATENT AND TRADEMARK OFFICE
CERTIFICATE OF CORRECTION

PATENT NO. : 5,300,569
DATED : April 5, 1994
INVENTOR(S) : Drake et al.

It is certified that error appears in the above-indentified patent and that said Letters Patent is hereby corrected as shown below:

In Column 31, line 33 (the second line of claim 2), delete "said" and replace with --acid--.

In Column 31, line 33 (the second line of claim 2), delete "sad" and replace with --said--.

In Column 31, line 50 (the last line of claim 2), delete "n" preceding "bond".

In Column 31, line 62 (the last line of claim 4), delete "twelve" and replace with --twenty--.

In Column 32, line 37 (the second line of subparagraph b) of claim 14), between the words "polymer" and "unsaturation" insert --having--.

Signed and Sealed this

Thirteenth Day of September, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,300,569
DATED      : April 5, 1994
INVENTOR(S) : Drake, et al

It is certified that error appears in the above-indentified patent and that said Letters Patent is hereby corrected as shown below:

Column 32, line 19; add the words "ethylene propylene diene rubber."

Signed and Sealed this

Seventeenth Day of June, 1997

Attest:

BRUCE LEHMAN

*Attesting Officer*　　　*Commissioner of Patents and Trademarks*